Jan. 5, 1971     E. A. BLOUNT     3,552,807

BEARINGS

Filed July 28, 1969

INVENTOR
Eric Albert Blount
BY
Baldwin Wight Diller & Brown
ATTORNEY

United States Patent Office 3,552,807
Patented Jan. 5, 1971

3,552,807
BEARINGS
Eric Albert Blount, Chelmsford, England, assignor to
The Marconi Company Limited, London, England, a
British company
Filed July 28, 1969, Ser. No. 845,157
Claims priority, application Great Britain, Aug. 9, 1968,
38,257/68
Int. Cl. F16c 17/16
U.S. Cl. 308—9                                      7 Claims

ABSTRACT OF THE DISCLOSURE

High load bearing which has one of its load bearing surfaces composed of deformable plastic plates, each plate having an aperture through which oil at high pressure is passed to the bearing surface. Linked to this aperture are shallow grooves formed in the bearing surface, but not extending to the periphery of the bearing surface so that the oil is contained within the deformable plates. The oil pressure is higher than the load per unit bearing surface area, but less than will break the oil seal between the deformable plates, which may be nylon or PTFE, and the other bearing surface.

Figure 1:
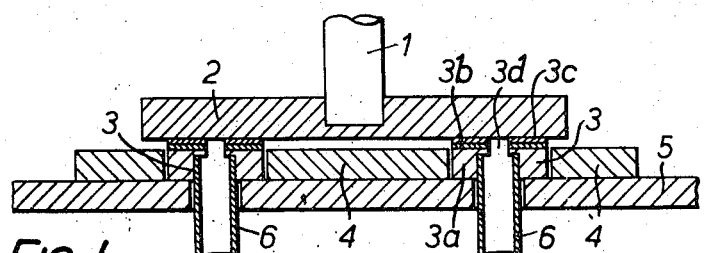

This invention relates to bearings.

There are a good many cases in which bearings are required to carry considerable loads which are required to be moved slowly and with high accuracy of positioning. An example of such a case—an example for which the application of this invention is particularly advantageous and for which, in fact, the invention was primarily made—is provided by a thrust bearing carrying a heavy tracking aerial. Such a bearing must, to be satisfactory, have a low coefficient of friction and—particularly important—must have as little "stick-slip" effect as possible, i.e., it must be capable of permitting smooth, nonjerky movement even at very slow speeds and must not present much more frictional resistance to movement when stationary than when moving. Because of these requirements it has been usual to employ, as thrust bearings carrying heavy tracking aerials, either fully hydrostatic bearings or bearings of the ball or roller type.

A fully hydrostatic bearing, by which is meant the type of bearing in which liquid—in practice oil—at high pressure is pumped continuously through it so that the load is "floated" on the oil continuously supplied, will satisfy the foregoing requirements quite well but has the important practical defects of being expensive (largely because of the cost of the pump and associated driving means required to provide the necessary substantial volumes of continuously supplied high pressure oil) and having undesirably large power consumption to drive the pump. Bearings of the ball and roller type are also good, so far as low friction and low "stick-slip" effect are concerned, but are again expensive and have the serious practical defect of being difficult and time-consuming to dismantle and replace in the event of failure. In a typical tracking installation, failure of a ball or roller thrust bearing carrying the tracking aerial will put the whole installation out of use and removing the failed bearing and replacing it by another is likely to occupy an unacceptably long period of time. The present invention seeks to provide improved bearings of low friction and minimum "stick-slip" effect which shall nevertheless be relatively inexpensive to construct, shall be of low power consumption and shall be relatively quick and easy to replace in the event of failure. Although the advantages of the invention are most manifest when applied to thrust bearings, the invention is also applicable to shaft journal bearings.

According to this invention the moving member of a bearing adapted to operate with partial hydrostatic lubrication is (when said bearing is in use) supported by liquid which is substantially trapped in at least one space between said member and the deformable plastic surface of bearing pad means by liquid sealing which extends around said space and is provided by mating contact between said member and a part of the area of said surface, said bearing pad means having liquid supply means adapted to lead liquid to said space at a pressure sufficient to provide said support but insufficient to break said sealing.

According to a feature of this invention the moving member of a bearing is supported by a plurality of bearing pads each having a surface which is adjacent said member and is of deformable plastic material, said surface having a peripheral portion which mates with said moving member to provide a boundary for the liquid and, inside the area bounded by said peripheral portion, shallow grooving communicating with a liquid supply passage leading through the pad whereby, when liquid at a predetermined pressure is applied to said passage, support for the moving member is provided by liquid which is substantially trapped in a space formed between said member and the area of said pad inside the said boundary.

In normal practice in carrying out this invention the liquid supplied under pressure will, of course, be oil.

In a preferred form of thrust bearing in accordance with the invention the moving member has a planar surface the thrust of which is taken by a plurality of thrust pads in mating contact at their peripheries with said surface of said moving member.

In a preferred form of shaft journal bearing in accordance with the invention the moving member is a shaft the cylindrical surface of which is in mating contact with the peripheral areas of a plurality of arcuate bearing pads arranged round the shaft.

Each of the pads preferably comprises a metal body member carrying a resilient support layer in turn carrying a deformable plastic layer in which oil grooving is formed.

The deformable plastic material is preferably PTFE or nylon.

Figure 2:
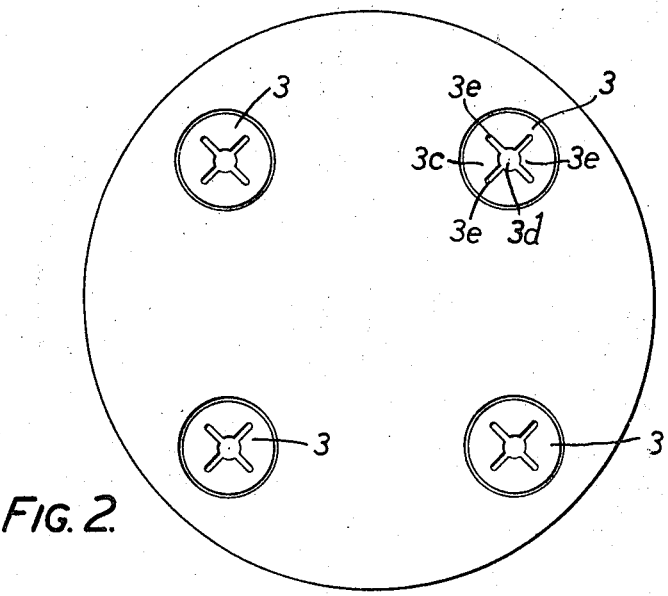
Figures 3, 4:
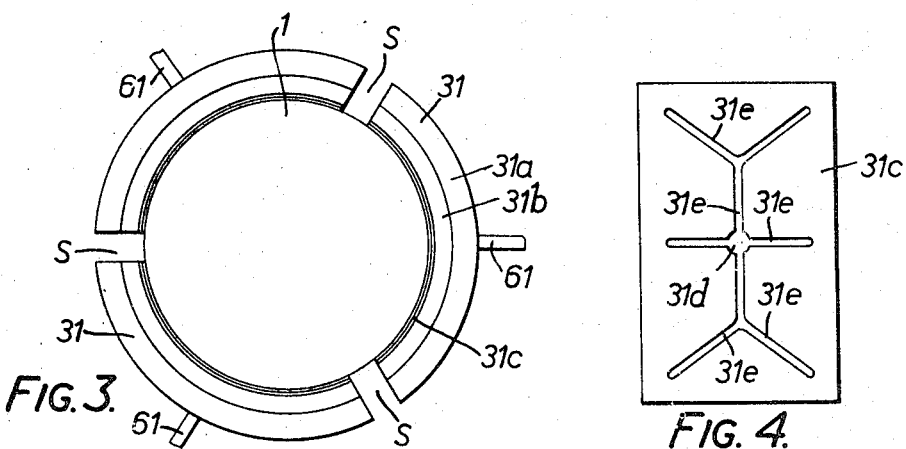

The invention is illustrated in the accompanying drawings which show two embodiments thereof. FIG. 1 is a sectional elevation of one form of thrust bearing in accordance with the invention and FIG. 2 is a view looking down on the thrust pad retaining disc of this bearing. FIG. 3 is an end elevation of one form of shaft journal bearing in accordance with the invention and FIG. 4 is a view looking into the inner face of one of the bearing pads of this bearing.

Referring to FIG. 1, the shaft 1 is a heavily loaded shaft—for example a shaft carrying and driving a large tracking serial (not shown)—which is required to be rotated slowly and to be accurately positioned at all times. It is important that it shall have a low coefficient of friction and particularly important that it shall be as free as possible from "stick-slip" effect, i.e., that, when required, it shall move smoothly through required angles of rotation and not move jerkily and therefore without good positional accuracy.

The shaft 1 is keyed to a bearing disc 2 the flat machined underface of which rests on a number of thrust pads 3. There may be any desired number of these pads and they may be in any of a wide variety of arrangements. In the particular case illustrated in FIGS. 1 and 2 there are four pads 3 equally spaced round a circle having the axis of the shaft 1 as centre. The upper faces of the pads 3, like the underface of the disc 2, are in a plane at right angles to the axis of the shaft 1.

The pads 3 are fitted, with a free but close fit, into circular holes in a pad retaining plate 4 and are prevented from falling through these holes by a back plate 5 which is fixed against rotation by means not shown. The plate 4 which is fixed against rotation and may be so fixed to the plate 5 by screws (not shown) screwing into the plate 5 and holding the plate 4 against it.

The pads are all alike. Each consists of a main cylindrical steel body member 3a to the upper face of which is stuck an asbestos fibre or similar backing disc 3b on which in turn is a thin bearing disc 3c of PTFE or similar deformable plastic material. In the case illustrated the peripheral edge of each bearing disc 3c has a small chamfer. An oil supply pipe 6 passes through the plate 5 to each thrust pad, being screwed into a central hole in the appropriate pad body member 3a to provide an oil tight union joint. So as not to complicate the drawing no attempt is made to show the details of the union joints, the pipes 6 being shown as though they were merely pushed into the central holes in the pad body members 3a. These central holes communicate with smaller aligned central holes in the upper parts of the pad body members 3a, the backing discs 3b and the bearing discs 3c, so that oil supply is made through each thrust pad to its upper face. The reference 3d indicates the oil supply hole in a bearing disc 3c.

Each oil supply hole 3d communicates with shallow grooving 3e in the bearing face of its bearing disc 3c. This grooving may take any of a variety of forms and is typically about 30 thousandths of an inch deep. It is important, however, that it does not extend to the peripheral edge of the thrust pad and in the upper face of which it is formed. In the case illustrated the grooving consists, in each case, of four radial grooves opening out of the central hole 3d, though any of a wide variety of other patterns or arrangements of oil grooves can be adopted so long as they stop well short of the edges of the thrust pads. So as not to complicate the drawing references to the various parts of the thrust pads are applied only to one pad.

High pressure oil is applied from any convenient high pressure oil supply (not shown) to the pipes 6. This oil flows up to and fills the oil grooving but is (except for a small amount of unavoidable leakage) prevented from escaping by an oil sealing action provided by close contact between that part of the upper face of each thrust pad which is outward of the oil grooving thereof and the corresponding opposite part of the underface of the disc 2. The oil pressure used is higher than the quotient of the load divided by the total bearing area provided by all the pads but not high enough to lift the disc 2 off the pads. Preferably the oil pressure is between 25% and 50% higher than the said quotient. A practical value of oil pressure for a typical thrust bearing as illustrated in FIGS. 1 and 2 and having bearing pressure of about 1500 lbs. per square inch is about 2000 to 2500 pounds/square inch and, in practice, with such a pressure applied, the amount of oil leakage, once the bearing has been "run in," is only about 4 cubic centimetres per hour. It is believed that, when the oil pressure is applied, the oil trapped (inwardly of the peripherical oil seals) between the upper faces of the pads and the underface of the disc 2, slightly deforms the upper face of the pads so that films of oil, thus trapped and under pressure, carry the load. The bearing thus runs with what may be termed partial hydrostatic support, the oil pressure being insufficient to lift the disc 2 off the bearing pads, and oil sealing contact remaining between the mating surfaces of the disc 2 and the bearing pads outwardly of the end of the oil grooving. Part of the load is taken through the oil film and the remainder directly by the plastic material of the bearing. The bearing has low coefficient of friction and low "stick-slip" effect characteristics similar to those of a fully hydrostatic bearing but does not require the continuous supply of considerable volumes of high pressure oil as do fully hydrostatic bearings. Moreover the bearing compares favourably in cost with both fully hydrostatic bearings (with their costly oil supply systems) and ball or roller thrust bearings and are much easier and quicker to replace, in case of necessity, than are the latter bearings.

FIGS. 3 and 4 shows a shaft journal bearing in accordance with the invention. In this bearing there are a number of arcuate pads 31 round the shaft 1, three pads being provided in the bearing illustrated. The pads are held in place by any convenient form of encircling structure (not shown). Each pad consists of an outer steel body member 31a on the inner face of which is an asbestos fibre or similar backing piece 31b with, in turn, a thin PTFE i.e., polytetrafluoroethylene or similar deformable plastic bearing piece 31c on its inner face. The pads embrace, between them, nearly all the periphery of the shaft, small spaces S being left between adjacent pads. High pressure oil is supplied through pipes 61 and thence via holes in the pads to their bearing surface. The oil supply holes in the parts 31a, 31b and 31c do not appear in the elevational view of FIG. 3. FIG. 4 however, is a view looking into one of the pads and the hole in the part 31c appears in this figure and is referenced 31d. This hole communicates with shallow grooving 31e. The pattern or arrangement of grooving shown in FIG. 4 is only one example of many different possible ones. This grooving, whatever its pattern, stops well short of the edges of the pad so as to leave oil sealing mating surfaces between the shaft and the adjacent pad surfaces outwardly of the grooving. As in the case of the thrust bearing of FIGS. 1 and 2, the bearing operates with partial hydrostatic support, the oil pressure being high enough to provide for the formation of load carrying oil films which are under pressure and are trapped (apart from unavoidable small leakage) by the oil seals provided by the mating surface of the shaft with the parts of the pads near their edges and outside the grooving, but not so high as to force these mating surfaces apart and thus break the seals.

I claim:

1. A bearing comprising a moving member which is provided with support, when the bearing is in use, hydrostatically by liquid which is substantially trapped in at least one space between said member and deformable plastic surface of bearing pad means by liquid sealing which extends around said space and is provided by mating contact between said member and a part of the area of said surface, said bearing pad means having liquid supply means adapted to lead liquid to said space at a pressure sufficient to provide said support but insufficient to break said sealing.

2. A bearing comprising a moving member which is supported by a plurality of bearing pads each having a surface which is adjacent said member and is of deformable plastic material, said surface having a peripheral portion which mates with said moving member to provide a boundary for the liquid and, inside the area bounded by said peripheral portion, shallow grooving communicating with a liquid supply passage leading through the pad whereby, when liquid at a predetermined pressure is applied to said passage, support for the moving member is provided by liquid which is substantially trapped in a space formed between said member and the area of said pad inside the said boundary.

3. A thrust bearing in accordance with claim 2 wherein the moving member has a planar surface the thrust of which is taken by a plurality of thrust pads in mating contact at their peripheries with said surface of said moving member.

4. A shaft journal bearing in accordance with claim 2 wherein the moving member is a shaft the cylindrical surface of which is in mating contact with the peripheral areas of a plurality of arcuate bearing pads arranged round the shaft.

5. A bearing as claimed in claim 2 wherein each of the pads comprises a metal body member carrying a resilient support layer in turn carrying a deformable plastic layer in which oil grooving is formed.

6. A bearing as claimed in claim 2 wherein the deformable plastic is polytetrafluoroethylene.

7. A bearing as claimed in claim 2 wherein the deformable plastic is nylon.

References Cited
UNITED STATES PATENTS 2,710,234   6/1955   Hansen _____ 308—9

M. CARY NELSON, Primary Examiner
FRANK SUSKO, Assistant Examiner